United States Patent [19]

Georgiou

[11] Patent Number: 4,635,250
[45] Date of Patent: Jan. 6, 1987

[54] FULL-DUPLEX ONE-SIDED CROSS-POINT SWITCH

[75] Inventor: Christos J. Georgiou, White Plains, N.Y.

[73] Assignee: International Business Machines Corporation, Armonk, N.Y.

[21] Appl. No.: 599,874

[22] Filed: Apr. 13, 1984

[51] Int. Cl.[4] ............................................. H04Q 3/00
[52] U.S. Cl. .................................. 370/58; 340/825.79; 379/291; 379/306
[58] Field of Search ................... 370/58; 340/825.79, 340/825.85, 825.8; 179/18 GF

[56] References Cited

U.S. PATENT DOCUMENTS 3,683,117 8/1972 Magnusson et al. ............ 179/18 GF
3,694,580 9/1972 Inose et al. ...................... 340/825.8
3,872,439 3/1975 Salam .............................. 340/825.79
4,186,277 1/1980 Schlichte ........................ 179/18 GF
4,198,546 4/1980 Schlichte ........................ 179/18 GF
4,491,838 1/1985 West ................................. 370/58

Primary Examiner—Douglas W. Olms
Attorney, Agent, or Firm—Sughrue, Mion, Zinn, Macpeak, and Seas

[57] ABSTRACT

A full-duplex one-sided switching chip comprising externally connected lines as input/output pairs and pairs of bi-directional interconnection lines. Duplex crosspoints selectively connect input/output line pairs to the interconnection line pairs. The interconnection lines can be coupled to interconnection lines on other chips for multichip switching arrays.

18 Claims, 12 Drawing Figures

FIG. 6    (*) SOURCE CHIP, (**) DESTINATION CHIP
(***) SOURCE/DESTINATION CHIP

FULL-DUPLEX ONE-SIDED CROSS-POINT SWITCH

DESCRIPTION

1. Technical Field

This invention relates to cross-point switches. In particular, it relates to full-duplex one-sided cross-point switches.

2. Background Art

Cross-point switches are used in the telephone and computer industry for switching communication lines. In a two-sided cross-point switch, the switch can be considered as a matrix of two sets of perpendicularly opposed lines. The points where the lines cross are the cross-points and sellectable switches interconnect the two lines at each cross-point. The lines on one side of the switch can be connected to the lines on the other side of the switch by activating the appropriate cross-point.

A one-sided switch, on the other hand, can interconnect any two lines connected to one side of the switch. Thus all lines are treated equivalently and there is no set direction of interconnection or of information flow through the switch. The present inventor has filed a patent application entitled "Fault-Tolerant Array of Cross-point Switching Matrices", Ser. No. 554,652, filed Oct. 24, 1983, herein incorporated by reference. This invention is illustrated in FIG. 1 and comprises an array of switching chips 10, 12, 14 and 16. Each chip 10-16 comprises a plurality of internal horizontal lines 18, 20 and 22 and vertical lines 24, 26 and 28. The intersections of the horizontal and vertical lines define the cross-points and there is a selectable switch at each cross-point controlled by a controller 30 via a control bus 32. Each of the internal horizontal lines 18, 20 and 22 is connected to an external line 34, 36 and 38. These external lines are also connected to other switching chips, such as 12, in the same row of the switching array in order to provide a switch of sufficient capacity with moderately sized switching chips.

If the external line 34 is to send information to external line 38, or vice-a-versa, and both these external lines 34 and 38 are connected to the same switching chip 10, then the controller 30 selects one of the internal vertical lines 26 and turns on the cross-points 40 and 42. Such an interconnection of the external lines 34 and 38 is a normal one-sided switching operation.

However, if the external line 36 is to be connected to an external line 44 that is connected to a different switching chip 14, then use must be made of vertical interconnection lines 46, 48 and 50 connected to the respective internal vertical lines 10 and 14. Then the controller 30 turns on a cross-point 52 in the one chip 10, connects the internal vertical line 24 to the interconnection line 46, connects the interconnection line 46 to a corresponding internal vertical line 54 in the other switching chip 14 and finally turns on a cross-point 56. Thereby any of the external lines can be connected together. The additional columns of switching chips 12 and 16 are required to allow sufficient capacity that a single column could not provide. Additionally, the added columns provide fault tolerance if one of the switching chips fails.

The above described cross-point switch is a half-duplex switch. This means that each external line 34, 36, 38 or 44 can either send information into the switching system or receive information from a switch, but cannot do both simultaneously. This bi-directionality requires that all the cross-points be bidirectional switches such as FETs. The single transmission path into and through the switch requires that information be sent in only one direction at any time on that transmission path so that the external lines must agree among the connected pair which one is receiving and which one is sending. However, in many communication systems whose lines are to be interconnected through a cross-point switch, communication must be full-duplex. That is, each of the two stations interconnected by a cross-point switch can simultaneously send and receive information to and from its connected station. Therefore, two paths must be established through a full-duplex cross-point switch for each interconnection.

Full-duplex cross-point switches have been previously described, such as in U.S. Pat. No. 4,032,893 to Moran. But it appears as though these prior art cross-point switches have always been two-sided switches. Full-duplex two-sided cross-point switches allow a predetermined direction of information flow on all lines. However, in full-duplex one-sided cross-point switches, the flow of information or electrical signals on the internal vertical lines or the interconnection lines can be in different directions, depending upon which external lines are to be interconnected.

Furthermore, the implementation of control for the cross-points of a full-duplex one-sided switch can be simplified by virtue of the fact that pairs of single line cross-points are being activated for the required pair of transmission paths through the switch. As the number of cross-points increases, the controller functions and the control lines to the switching chips become a larger part of the total system and any simplification in the control functions will produce a large saving in system complexity.

SUMMARY OF THE INVENTION

The present invention is a cross-point for a one-sided full-duplex switch in which two uni-directional input/output lines are simultaneously switched to two bi-directional interconnection lines. The number of decoders, latches, drivers and cross-points can be significantly decreased over cross-point switches not explicitly using the full-duplex architecture.

Accordingly, it is an object of this invention to provide a full-duplex one-sided cross-point switch. It is a further object of this invention to provide a cross-point switch with a minimum of control lines and peripheral circuitry. It is yet a further object of this invention to provide a cross-point switch that switches at high rates.

DETAILED DESCRIPTION OF THE PREFERRED EMBODIMENTS

Figure 1:
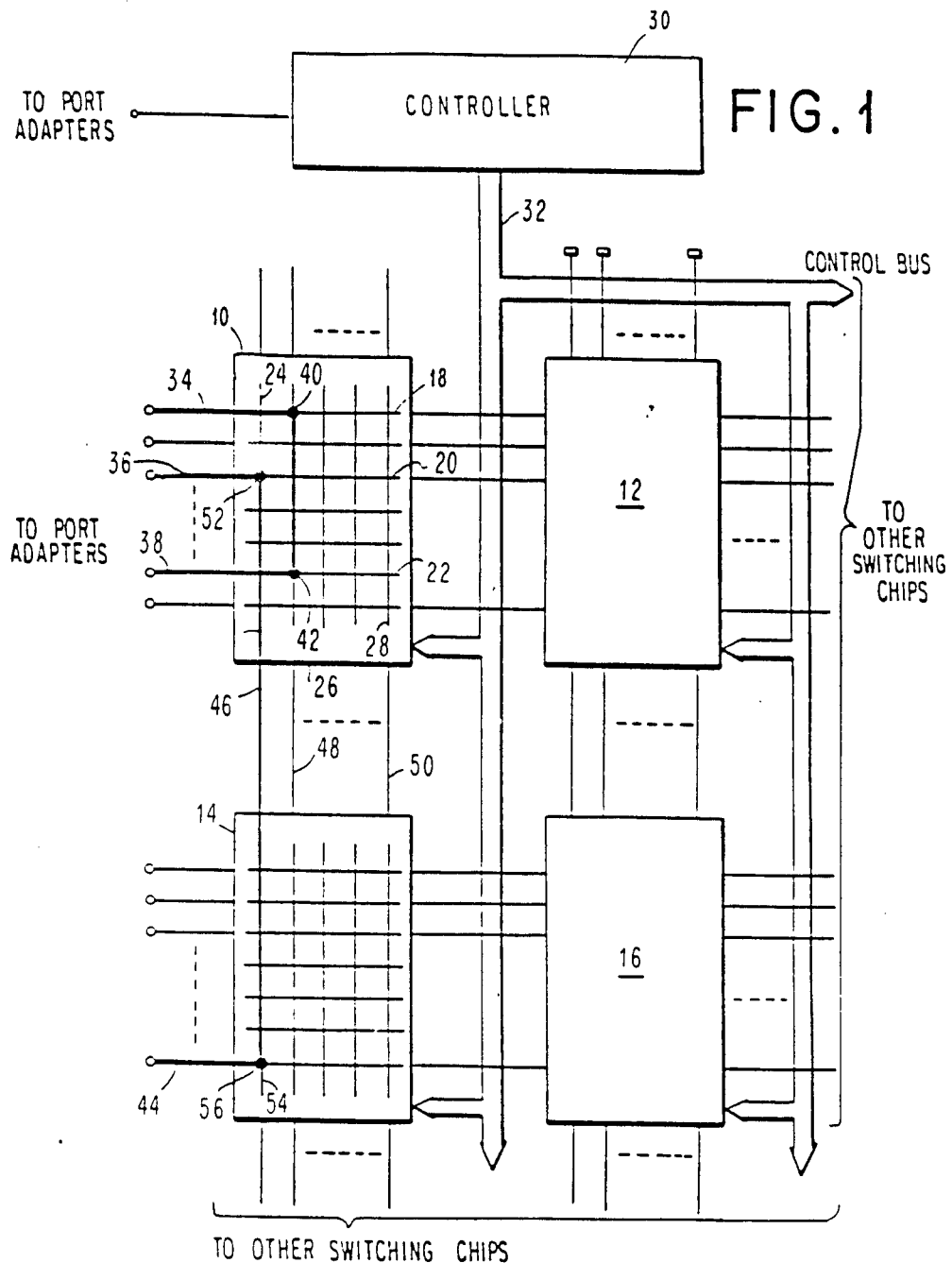
FIG. 1 is a schematic diagram of a one-sided cross-point switch using an array of switching chips.
Figure 2A:
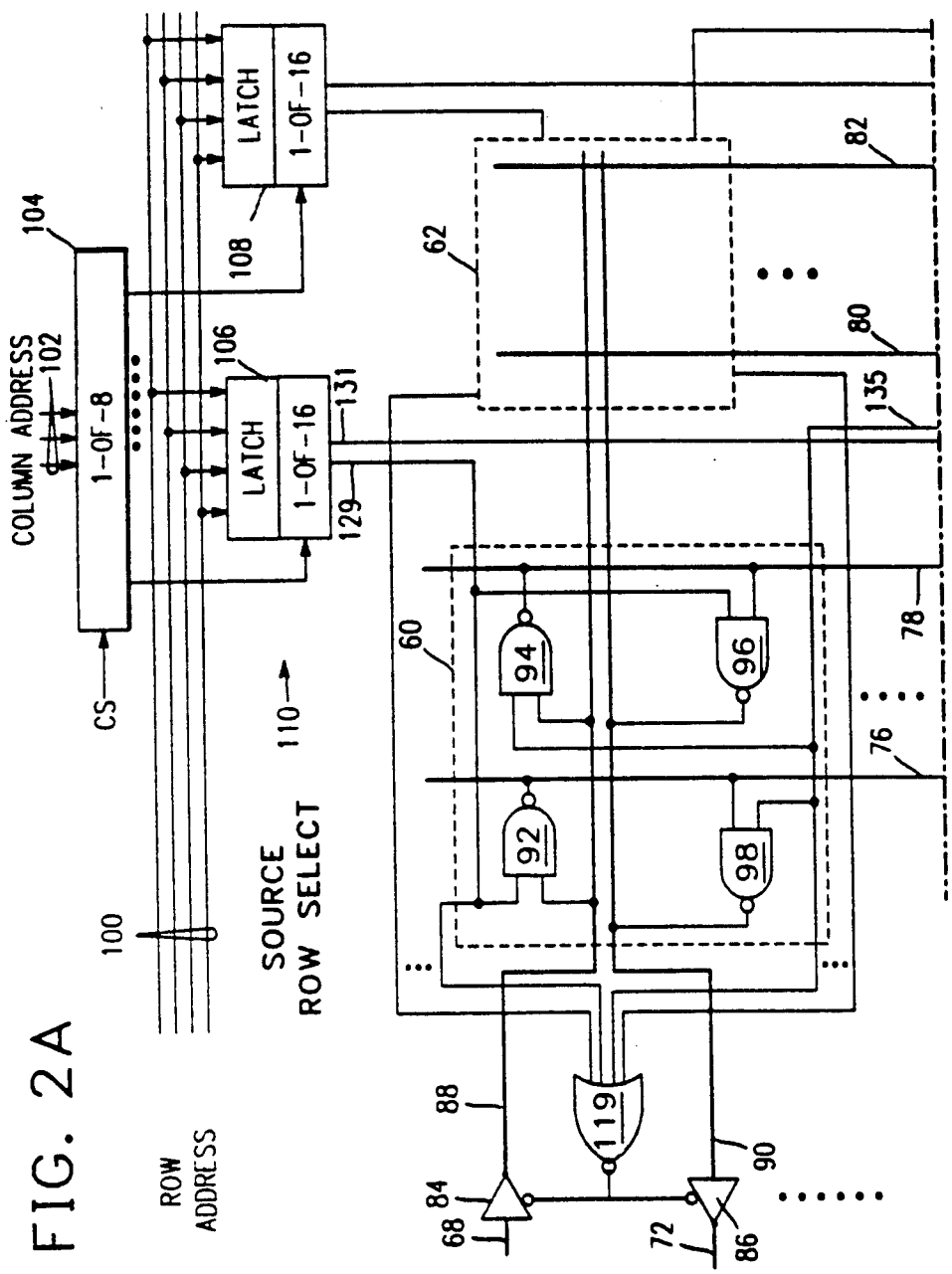
FIGS. 2A and 2B are schematic diagrams of a cross-point switching chip of the present invention.
Figure 2B:
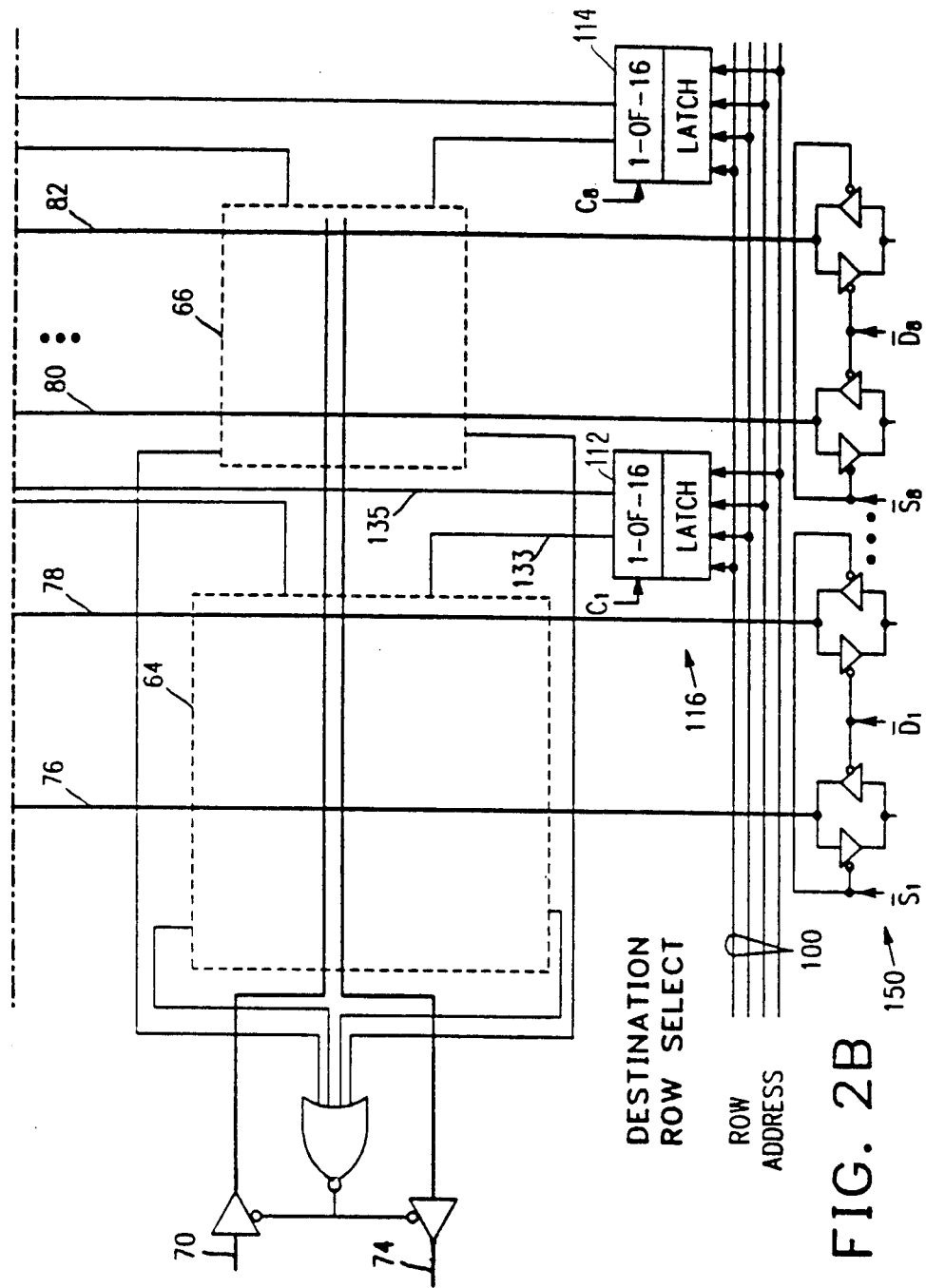

The invention will now be described as applied to a 32×16 full-duplex high-speed cross-point switching chip, illustrated in FIG. 2. There are 16×8 or 128 full-duplex cross-points 60, 62, 64 and 66. Only one duplex cross-point 60 is illustrated in detail. There may be multiple switching chips, as disclosed in the previously discussed application of the present inventor and as described with reference to FIG. 1. The external lines are divided into input lines 68 and 70 and output lines 72 and 74. Each input line is paired with a corresponding output line to form a full-duplex communication line. The function of the switching chip is to interconnect selected sets of the duplex external lines through internal vertical lines 76, 78, 80 and 82. In FIG. 2, all data lines are represented by heavy lines while control lines controlling the switching operation are denoted by light lines. The internal vertical lines 76–82 are paired so the full-duplex communication is maintained through the switching chips. However, in one-sided switches the internal vertical lines must allow for information flow in either direction depending upon which two pairs of external lines are interconnected. Thus the internal vertical lines 76–82 are bi-directional.

The switching chip can be described as an array of cross-points 60–66 arranged in rows and columns. Each row of cross-points is connected to one pair of external lines while each column is connected to one pair of internal vertical lines. Each of the input external lines, such as 68 is connected to a receiver 84 and each output external line, such as 72, is connected to a driver 86. The receiver 84 and the driver 86 are connected respectively to an internal horizontal input line 88 and an internal horizontal output line 90 which pass through all the cross-points 60 and 62 of that row. If the cross-point 60 is selected, it simultaneously makes a connection between the input line 88 and one of the internal vertical lines 76 and 78 and another connection between the output line 90 and the other of the internal vertical lines 76 and 78. Which of the two sets of connections is made depends on whether the external lines 68 and 72 are source lines or destination lines, as described in detail in the patent application, Ser. No. 554,653, of the present inventor entitled "Controller for a Cross-point Switching Matrix" and filed on Oct. 24, 1983. The designation of the external lines 68 and 72 as either source or destination lines will determine the direction of information flow on the internal vertical lines 76 and 78. The cross-point 60 consists of four NAND gates 92, 94, 96 and 98 which will be designated respectively as upper-left, upper-right, lower-right and lower-left. The NAND gates 92–98 are inverting unidirectional gates. Because a transmission path from one external line entering a switching system to another external line leaving the system passes through two NAND gate, the two inversions cancel. A NAND gate is a special type of AND gate which could also be used in the invention. Another special case of a NAND gate is a tri-state driver which uses one of the two NAND gate inputs as an enabling input to the driver with the other input being gated through the tri-state driver. The tri-state driver soles potential problems with the fan-in and fan-out requirements of the particular technology being used to implement the switching chip. Other types of gates are usable with this invention.

The use of AND gates in cross-point switches has been described by Dagnall in U.S. Pat. No. 3,573,388 and by Makaemachi et al in U.S. Pat. No. 4,068,215. One input of each NAND gate is used as a control gate to turn on the switch when the control input is logical true. The other input is connected to a data line from which information is being received and the complemented output of the NAND gate is connected to the data line onto which data is being transmitted from the gate. If the external lines 68 and 72 are source lines, then the upper-left NAND gate 92 couples the input horizontal line 88 onto the internal vertical line 76 and the lower-right NAND gate 96 couples the internal vertical line 78 onto the output horizontal line 90. On the other hand, if the external lines 68 and 72 are destination lines, then the upper-right NAND gate 94 couples the input horizontal line 88 onto the internal vertical line 78 and the lower-right NAND gate 98 couples the internal vertical line 76 onto the output horizontal line 90.

The control circuitry on the switching chip is designed so that any duplex cross-point 60–66 designated by a row address on a row address bus 100 and a column address on a column address bus 102 can be activated as a source or a destination cross-point. Latches are provided so that once a particular cross-point has been switched on, the controller and the address buses 100 and 102 can proceed to different tasks with the cross-point left connected. A subsequent disconnection procedure is necessary to disconnect the cross-point.

The column address bus 102 is connected to a one-of-eight column decoder 104. A chip select control signal CS controls the connection or disconnection of any cross-point 60–66 on the chip and activates the decoding in the column decoder 104. The column decoder 104 upon a true chip select signal CS decodes the column address bus 102 and outputs a true signal on the one of its output $C_1$–$C_8$ pointed to by the column address bus 102. Each of the outputs $C_1$–$C_8$ is associated with a column of the switching matrix. Each column has a one-of-sixteen source row decoder 106 or 108 in a source row select section 110 and also has a similar destination row decoder 112 or 114 in a destination row select section 116. Each of the outputs of the column decoder 104 is connected to both the source and destination row decoders associated with that column. For instance, the first column output $C_1$ is connected to the row decoders 106 and 112 of the first column.

Figure 3:
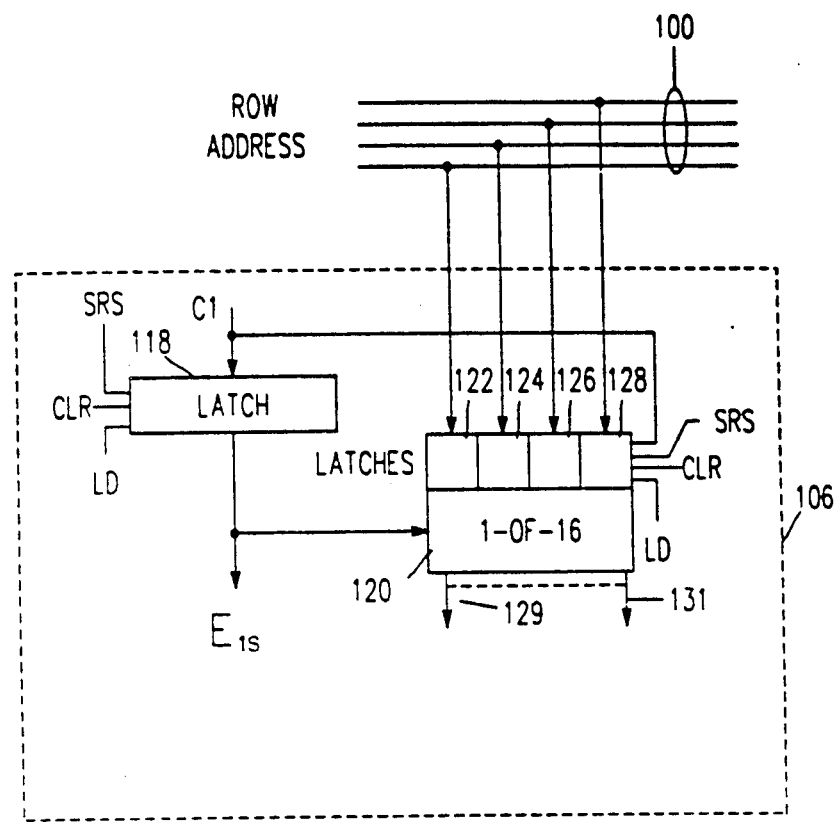
FIG. 3 is a schematic diagram of a row decoder for the circuit of FIG. 2.

The details of the connections to the source row decoder 106 are given in the schematic diagram of FIG. 3. The $C_1$ signal from the column decoder 104 is loaded into an enable latch 118 by a load signal LD. The latch 118 of the source row decoder 106 is selected by a source row select signal SRS. The output $E_{1S}$ of the enable latch 118 enables a 1-of-16 row decoder 120 that has four latches 122, 124, 126 and 128 at its input receiving signals from the row address bus 100. The row address is latched when the latches 122–128 are selected by the $C_1$ signal from the column decoder 104 and by the source row select signal SRS and the latches 122–128 are loaded by the load signal LD. One of the row decoder outputs 129 and 131 indicates which row is selected as the source cross-point.

Figure 4:
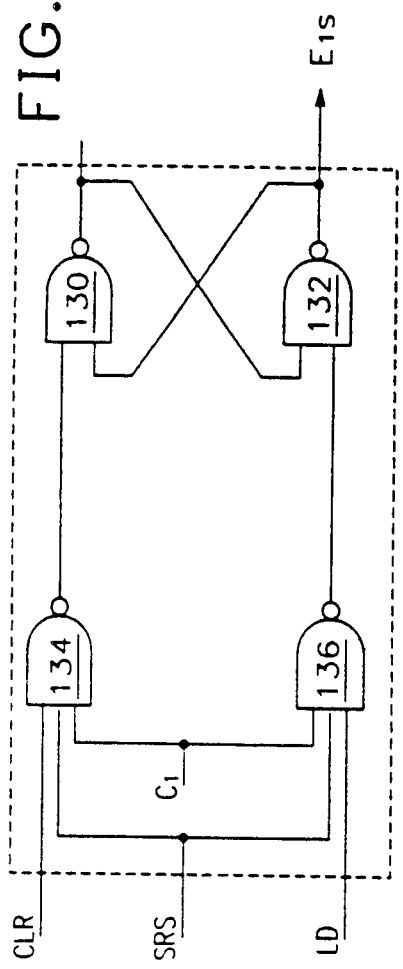
FIG. 4 is a schematic diagram of an enable latch for the row decoder of FIG. 3.

The design of the enable latch 118 is illustrated in FIG. 4. It includes two NAND gates 130 and 132 arranged in a flip-flop receiving inputs from two three-input NAND gates 134 and 136 receiving the four control signals $C_1$, SRS, LD and a clear signal CLR. The non-invering output of the flip-flop NAND gates 130 and 132 is the enable signal $E_{1S}$. The design of the one of the four latches 122–128 receiving the $A_0$ input from the row address bus 100 is illustrated in FIG. 5.

One four-input NAND gate 138 receives the address signal $A_0$ as well as the control signals $C_1$, SRS and LD. A parallel three-input NAND gate 140 receives the control signals $C_1$, SRS and CLR. The outputs of the NAND gates 140 and 138 are led respectively to the $\overline{R}$ and $\overline{S}$ inputs of a flip-flop consisting of two NAND gates 142 and 144. The non-inverting output $A_0'$ of the flip-flop is the latched input signal $A_0$.

Figure 5:
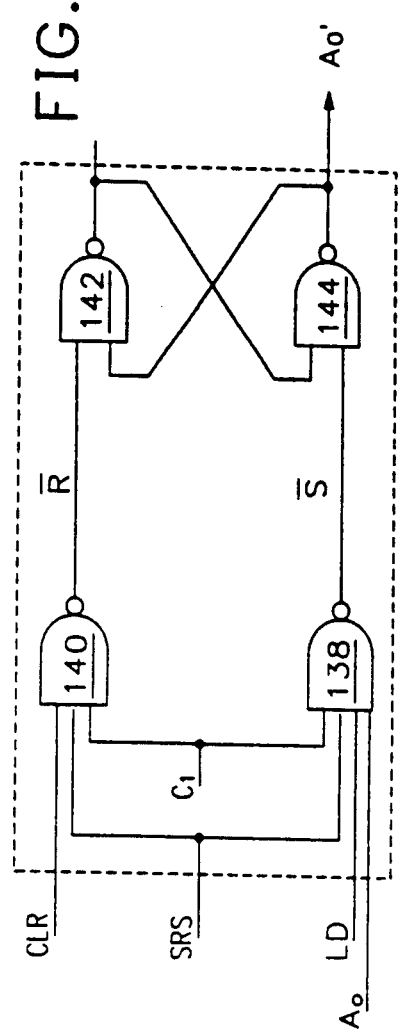
FIG. 5 is a schematic diagram of a row address latch for the row decoder of FIG. 3.

For the other source row decoders, such as 108, FIGS. 3–5 are modified by substituting another of the outputs of the column decoder 104 for the $C_1$ signal. For the destination row decoders 112 and 114, a destination row select signal DRS is substituted for the source row select signal SRS. The output of an enable latch for the first column destination row select decoder 112 is $E_{1D}$.

Thus, for example, when the source row select section 110 is loaded by a ture SRS and the first column is designated by the column decoder 104 by a true signal $C_1$, the latches 122–128 in the source row decoder 106 are loaded with the contents of the row address bus 100. The row decoder 106 decodes the four-bit binary signal and outputs a true cross-point enable source signal CPES on one of its outputs 129 and 131 indicating which of the cross-points 60 and 64 is to be turned on as a source cross-point. If the row address indicates the cross-point 60 in the first row, then the output of the decoder 106 turns on the upper-left and lower-right NAND gates 92 and 96. On the other hand, if the destination row select section 116 is turned on by a true DRS signal, the row address is loaded into the latches of the destination row decoder 112 selected by the column decoder 104 output signal $C_1$. The destination decoder 112 outputs a true cross-point enable destination signal CPED on one of its outputs 133 and 135 and its first row output turns on the upper-right and lower-left NAND gates 94 and 98.

Figure 6:
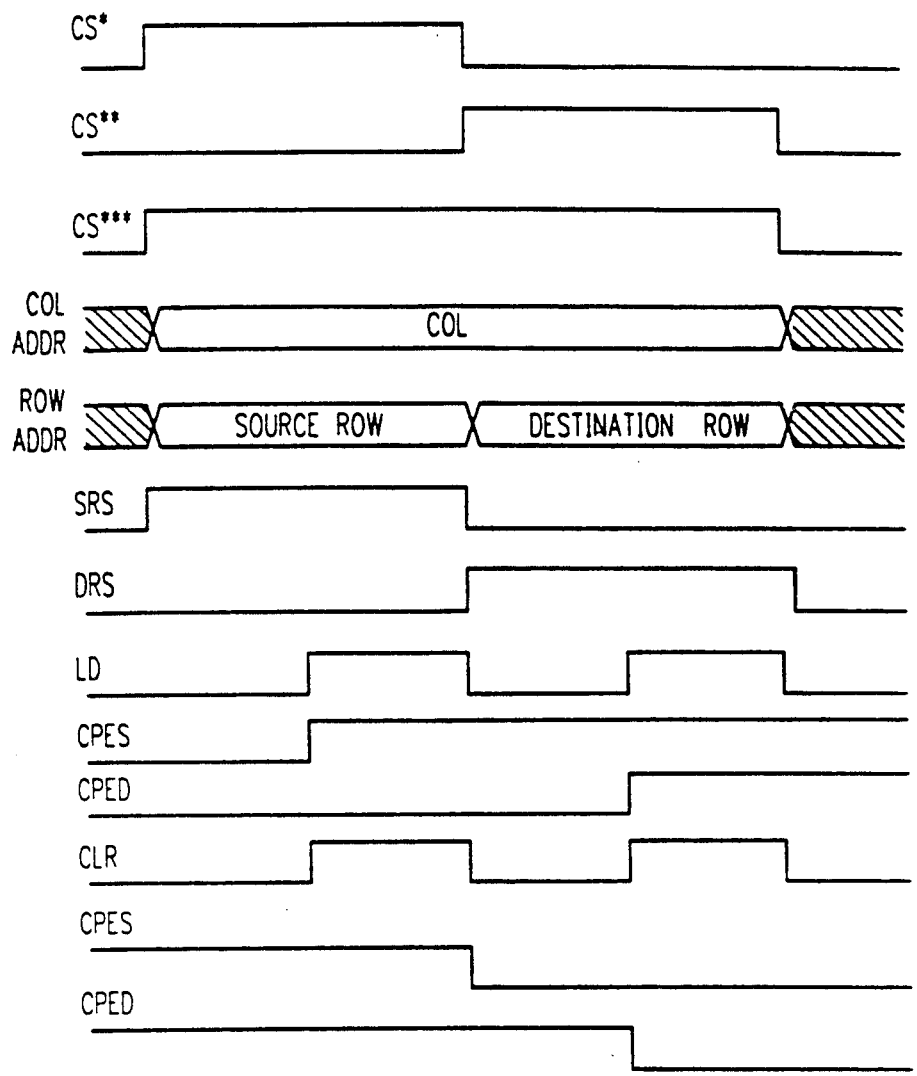
FIG. 6 is a timing diagram for the operation of the switching chip of FIG. 2.

The switching chip illustrated in FIG. 2 is designed so that the source row address and the destination row address are sent from the controller 30 at different times on the row address bus 100. A timing diagram for the operation of the switching chip is presented in FIG. 6.

The chip select signal CS to a particular chip is true for the entire time that the chip is undergoing connection or disconnection of its source cross-point and is also true for the connection or disconnection of its destination cross-point. If only the source or the destination cross-point is being operated upon on a particular chip, the CS signal is only true for that part of the sequence. This signal CS is connected to the select input of the column decoder 104.

The column address COL is valid on the column address bus 102 for the entire sequence. The column address COL causes the column decoder 104 selected by the column select signal CS to make one of its outputs true, for instance $C_1$ which is led to both the destination and source row decoders of the appropriate column.

The source row address and destination row address are sequentially valid on the row address bus 100 for being latched into a source and a destination row decoder respectively. The two operations upon source and destination row decoders are activated by sequentially valid source and destination row select signals SRS and DRS respectively. Upon a first load signal LD being true concurrently with a true source row select signal SRS, the source row decoder 106 or 108 selected by the column decoder 104 outputs a latched cross-point enable source signal CPES to the selected row cross-point in that column. Upon a second load signal LD true concurrently with a true destination row select signal DRS, the destination row decoder 112 or 114 selected by the column decoder outputs a latched cross-point enable destination signal CPED to the selected cross-point in that column. The constant value of the column address COL assures that the activated cross-points are in the same column, whether on the same switching chip or different switching chips. Because the cross-point enable source and destination signals CPES and CPED are latched, they both remain true even after the completion of the connection procedure with CS goes false.

As previously described, the cross-point enable source signal CPES turns on the upper-left and lower-right NAND gates 92 and 96 of the selected source cross-point on the chip and the cross-point enable destination signal CPED turns on the upper-right and lower-left NAND gates 94 and 98 of the selected destination cross-point. Of course, on any chip it is possible that both source and destination cross-points are activated, or either one is activated in the illustrated timing diagram depending on the values of the chip select signal CS.

Cross-points are deactivated or disconnected by a sequence of signals nearly identical to the connection sequence except that instead of the load signal LD going true, the clear signal CLR goes true. By the circuitry illustrated in FIGS. 2–5, the clear signal CLR causes the latched cross-point enable source and destination signals CPES and CPED to go false, as illustrated in the bottom two traces of FIG. 6.

Referring again to FIG. 2, the receiver 84 and the driver 86 connecting the external lines 68 and 72 to the internal horizontal lines 88 and 90 are enabled only when one of the cross-points 60 and 62 to which they are connected is activated. This is accomplished by a sixteen-input NOR gate 119 that has connected to its inputs all of the cross-point enable signals CPES and CPED for that row, both source enable and destination enable. The complemented output of the NOR gate 119 is connected to the complemented enable inputs of the receiver 84 and the driver 86.

If both the source cross-point and the destination cross-point are on one chip, as shown in FIG. 2, the illustrated circuitry accomplishes full-duplex cross-point switching. However, if there are multiple chips, as illustrated in FIG. 1, the destination cross-point may be on a different chip from the source cross-point.

If this occurs, the chip select signal CS is true for the chip containing the source cross-point only when the source row select signal SRS is true. Furthermore, the chip select signal CS is true for the chip containing the destination cross-point only when the destination row select signal DRS is true.

Figure 7:
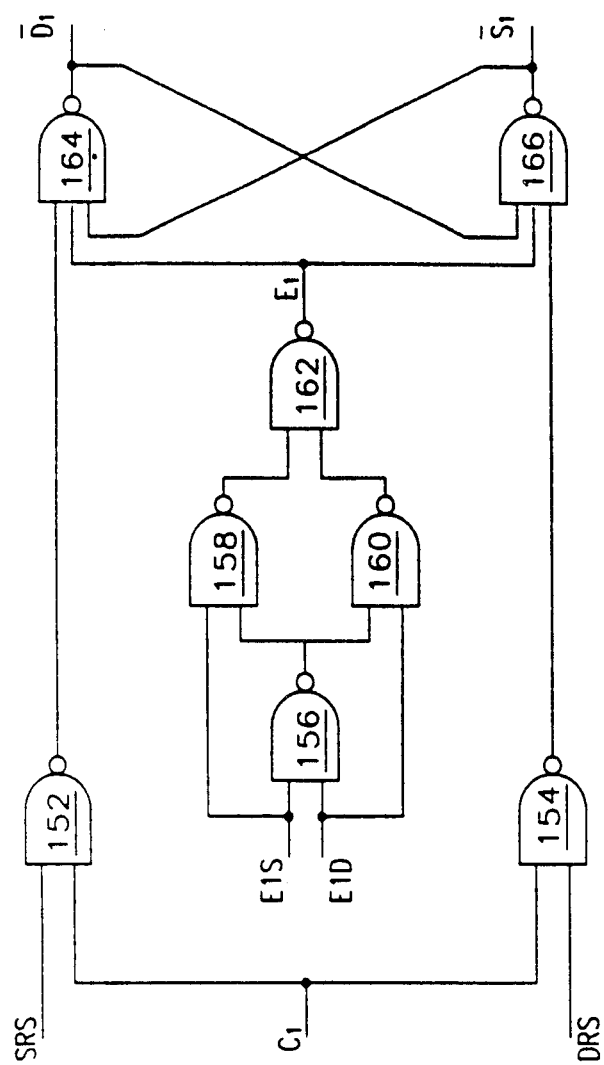
FIG. 7 is a schematic diagram of a circuit for enabling the bidirectional drivers of FIG. 2.

For a cross-point connection involving two chips, the signal travels between the chips on two external vertical lines 46–50 associated with the pair of internal vertical lines on both switching chips. A bi-directional duplex driver 150, shown in FIG. 2, connects the internal vertical lines 76 and 78 to the external vertical lines. It is necessary that only one of the driver and receiver attached to each line is enabled at one time, depending on whether the one cross-point on that column in the chip is a source cross-point or a destination cross-point. Otherwise the driver and receiver being both activated would oscillate. Two signals $\overline{S}$ and $\overline{D}$ are used to control the individual drivers of the duplex bi-directional driver. A true $\overline{S}$ signal indicates that one cross-point in that column has been selected as a source cross-point while a true $\overline{D}$ signal indicates that one cross-point has been selected as a destination cross-point. If both the source and destination cross-points for that column are selected on the same chip, then neither $\overline{S}$ nor $\overline{D}$ is true because no off-chip driving is required. A circuit for producing the $\overline{S}$ and $\overline{D}$ signals for the duplex driver 150 is illustrated in FIG. 7. The circuit consists of two NAND gates 152 and 154 which gate the source and destination row signals SRS and DRS respectively by the select signal $C_1$ enable for that column for that chip. The output of the NAND gates 152 and 154 are applied to further circuitry for each column of the chip. The further circuitry for the first column is illustrated in FIG. 7. The outputs $E_{1S}$ and $E_{1D}$ of the enable latches 118 attached to the source and destination row decoders 106 and 112 of that column are led into the inputs of a NAND gate 156. The output of that NAND gate 156 gates the $E_{1S}$ and $E_{1D}$ signals through NAND gates 158 and 160 respectively which are then combined in a NAND gate 162 to produce an output signal $E_1$. The NAND gates 156–162 are configured as an exclusive-OR gate which produces a true output $E_1$ only if only one of the signals $E_{1S}$ and $E_{1D}$ is true and the other is false. If neither is true, that column has no activated cross-points. If both are true, both the source and destination cross-point are on the same chip in that colum so that no off-chip driving is necessary or allowed.

The $E_1$ signal acts as a enable input into a flip-flop comprising two three-input NAND gates 164 and 166. The flip-flop is switched by the output of the NAND gates 152 and 154 and produces the complemented receiver enable signal $\overline{D}_1$ and the complemented driver enable signal $\overline{S}_1$. These signals $\overline{D}_1$ and $\overline{S}_1$ respectively enable the receiver and driver for the first column. The driver and receiver enable signals $\overline{D}_1$ and $\overline{S}_1$ are latched by the flip-flop so that they remain valid after the source or destination row signal SRS or DRS has gone false. A subsequent SRS or DRS signal may cause the flip-flop to reset.

The switching chip illustrated in FIG. 2 is often connected in a system utilizing ports, which receive communication lines from external devices and act as interfaces into the switching system. One function of the ports, as described in the second previously cited patent application Ser. No. 554,653, of the present inventor, is to provide the controller with sufficient information received on the external communication line to enable the controller to select appropriate cross-points. In such a system it may be desirable to pipeline the data flow through the system once the cross-point connections have been made. This is accomplished by making the receiver 84 and driver 86 attached to each of the external lines a latching amplifier. That is, the receiver 84 or driver 86 detects on its input a value of data and latches that value. Thereafter, it retransmits the data while simultaneously receiving the next bit of data in the data stream. The system can have the data pipelined in three stages: from receiving port to chip receiver, from chip receiver to chip driver, whether the receiver and driver are on the same or different switching chips, and from chip driver to transmitting port. The connections required for this pipelining are not illustrated in FIG. 2 but only require the connection of a global clock to all the latching receivers and drivers 84 and 86 as well as to the ports. The switching system further requires the global clock to be distributed to the port logic, matrix controller and to the matrix of switching chips itself. Because of the central location of the switching matrix, it is preferable to place the clock generator in the same package as the switching matrix in order to eliminate clock skewing and timing inconsistencies. The electrical interconnects between the ports and the switching chips should be selected in light of possible high speed applications of the switching system.

The circuitry associated with the cross-point switching chip illustrated in FIG. 2 has the advantage of a small number of latches that are required. The overall number of on-chip latches is reduced by exploiting the fact that on any given pair of internal vertical lines at most two cross-points are selected. Therefore two sets of four latches associated with the row decoders 106 and 112 are sufficient to select the appropriate cross-point rows. This is in contrast with the usual method of having a latch at each cross-point. The number of latches depends upon the size of the switching chip. For a chip of size 16×8, ten latches plus two 1-of-16 decoders 110 and 116 are needed per pair of internal vertical lines. The conventional scheme would require 32 latches per pair of internal vertical lines plus some decoding logic for latch selection. The enabling of the appropriate internal vertical lines is done by means of a 1-of-8 column decoder 104 and ten latches. All the row decoders are implemented such that the state of all the latches can be read by the controller via the row address bus 100. The number of signal I/O lines, both for data and control, as well as the overall gate and pin-out requirements for a 16×8 chip are summarized in Table I. In determining the number of gates, the assumption is made that each latch consists of four gates. Furthermore, it is assumed that the 16-input NOR gates can be implemented by four 4-input NOR gates (with dotted-OR or open-collector outputs). These gate requirements can be easily handled using gate arrays or other conventional technologies.

TABLE I

16 × 8 SWITCHING CHIP REQUIREMENTS

A. Data I/O Lines
1. 16 Input
2. 16 Output
3. 16 Input/Output

B. Control I/O Lines
1. CA0–CA2 (3) Column Address
2. RA0–RA3 (4) Row Address
3. CS (1) Chip Select
4. SRS (1) Source Row Select
5. DRS (1) Data Row Select
6. LOAD (1) Load Data into Latch
7. CLEAR (1) Clear Latch
8. READ (1) Read State of Latch
9. CLCK (1) Clock Line
   TOTAL SIGNAL I/O's 62

C. CIRCUITS
1. 512 2-Input NAND Gates
2. 16 Drivers (3-state, latching)
3. 16 Receivers (latching)
4. 16 Drivers/Receivers
5. 80 Latches (320 Gates)

TABLE I-continued

| | |
|---|---|
| 6. | 256 5-Input AND Gates |
| 7. | 16 16-Input NOR Gates |
| 8. | 8 4-Input NAND gates |
| 9. | 8×8=64 Control Gates (Bidirectional Driver Enable) |
| 10. | Miscellaneous Control Gates |
| | TOTAL GATES 1214 |

Figure 8:
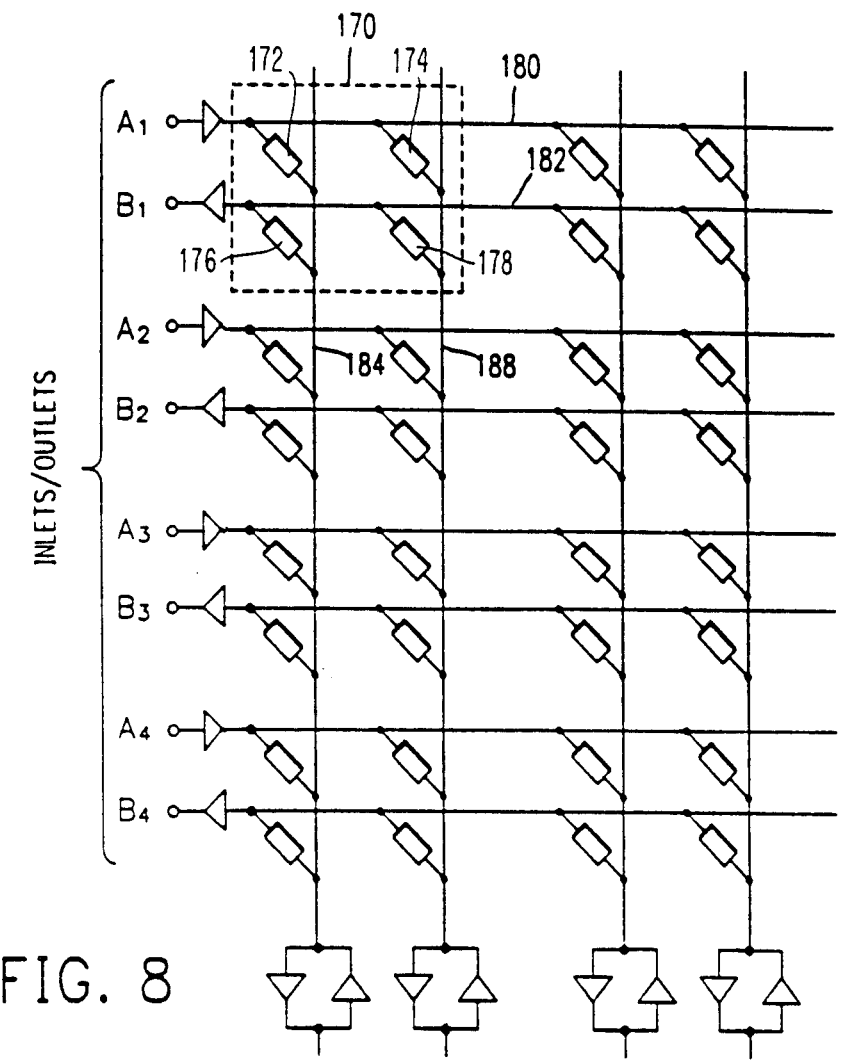
FIG. 8 is a schematic diagram of a switching chip for a second embodiment of the present invention.

The switching chip of FIG. 2 uses NAND gates for switches at the individual cross-points. NAND gates are uni-directional switches since the data can flow only from the input to the output of the enabled NAND gate. Other types of switches can be used for connecting the individual cross-points. For example, a field-effect transistor (FET) can provide a bi-directional switch. An example of a full-duplex one-sided cross-point switching chip implemented with FETs is illustrated in FIG. 8. Each duplex cross-point 170 consists of four FETs 172, 174, 176 and 178 connecting two internal horizontal lines 180 and 182 to two internal vertical lines 184 and 186. The control circuitry illustrated in FIG. 2 can be directly applied to the FET switching chip of FIG. 8 with the cross-point enable lines connected to the gate inputs of the corresponding FET 172-178.

Figure 9:
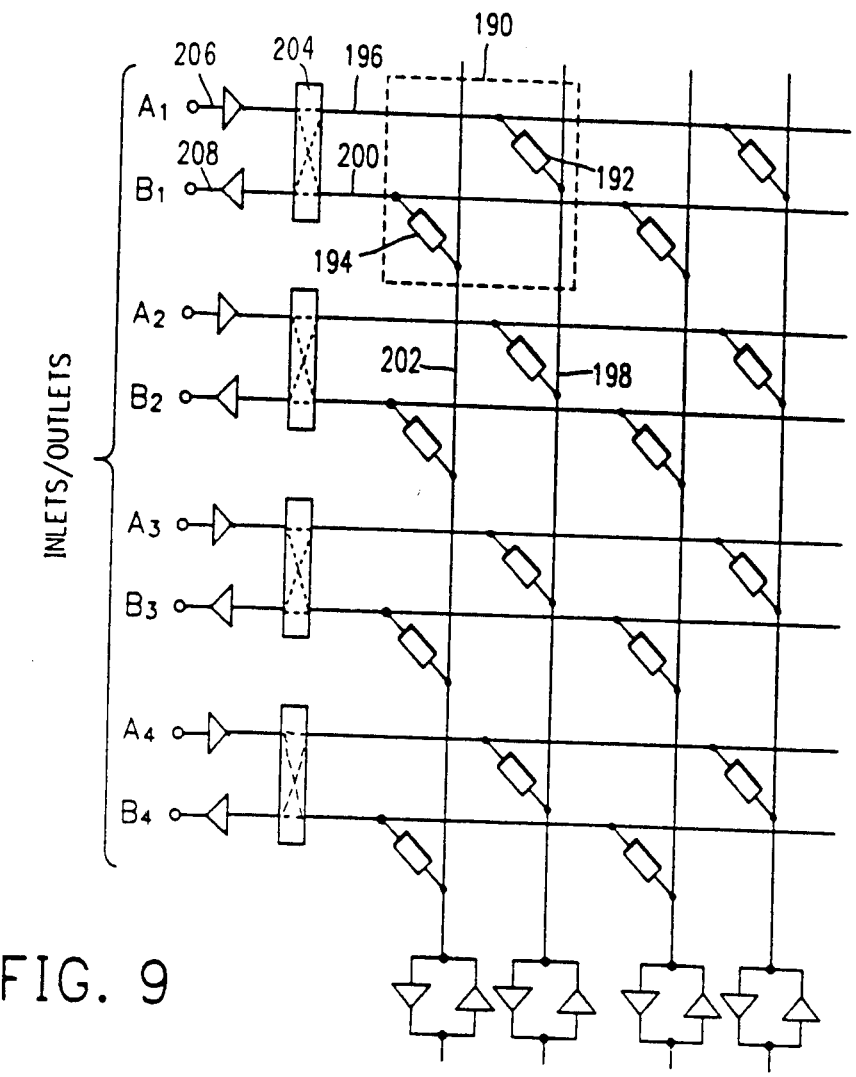
FIG. 9 is a schematic diagram of a switching chip of a third embodiment of the present invention.

The use of FETs for switches at the individual cross-points allows a further reduction in the number of gates required for a switching chip. Such a switching chip is illustrated in FIG. 9, in which each cross-point 190 consists of two FETs 192 and 194. One FET 192 couples one internal horizontal line 196 to one internal vertical line 198 while the other FET 194 links the other internal horizontal line 200 to the other internal vertical line 202. These two FETs 192 and 194 are enabled if the duplex cross-point is selected as either a source cross-point or a destination cross-point. There is further provided a double 1-of-2 multiplexer 204 that switches two external lines 206 and 208 between the internal horizontal line 196 and 200 depending on whether the cross-point 190 is a source or a destination cross-point. If the cross-point 190 is a source cross-point, then the multiplexer 204 connects the external line 206 to the internal horizontal line 196 and connects the external line 208 to the internal horizontal line 200. On the other hand, if the cross-point 190 is a destination cross-point, the multiplexer 204 instead connects the external line 206 to the internal horizontal line 200 and connects the external line 208 to the internal horizontal line 196.

With the reduced number of FET switches, the advantage of the elaborate control circuitry of FIG. 2 becomes less apparent since a smaller number of latches associated with each cross-point switch are required. A possible alternative latching scheme is to provide one latch per duplex cross-point. The latch would be enabled by an AND gate connected to a control line for the selected row and a control line for the selected column. Of course, additional circuitry is required to control the multiplexer 204 depending upon the designation as a source or destination of the selected cross-point in that row.

Figure 10:
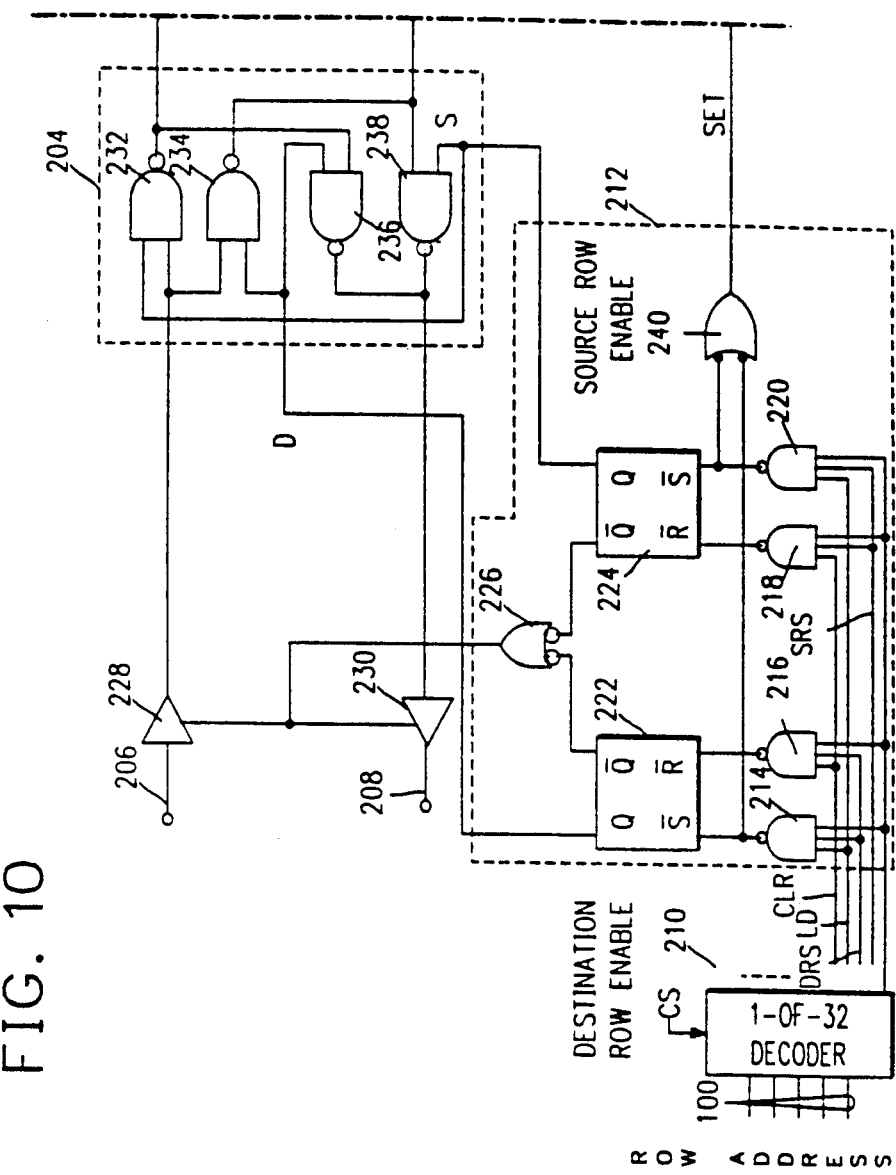
FIGS. 10 and 10B are schematic diagrams of control circuitry for use with the switching chip of FIG. 9.
Figure 10B:
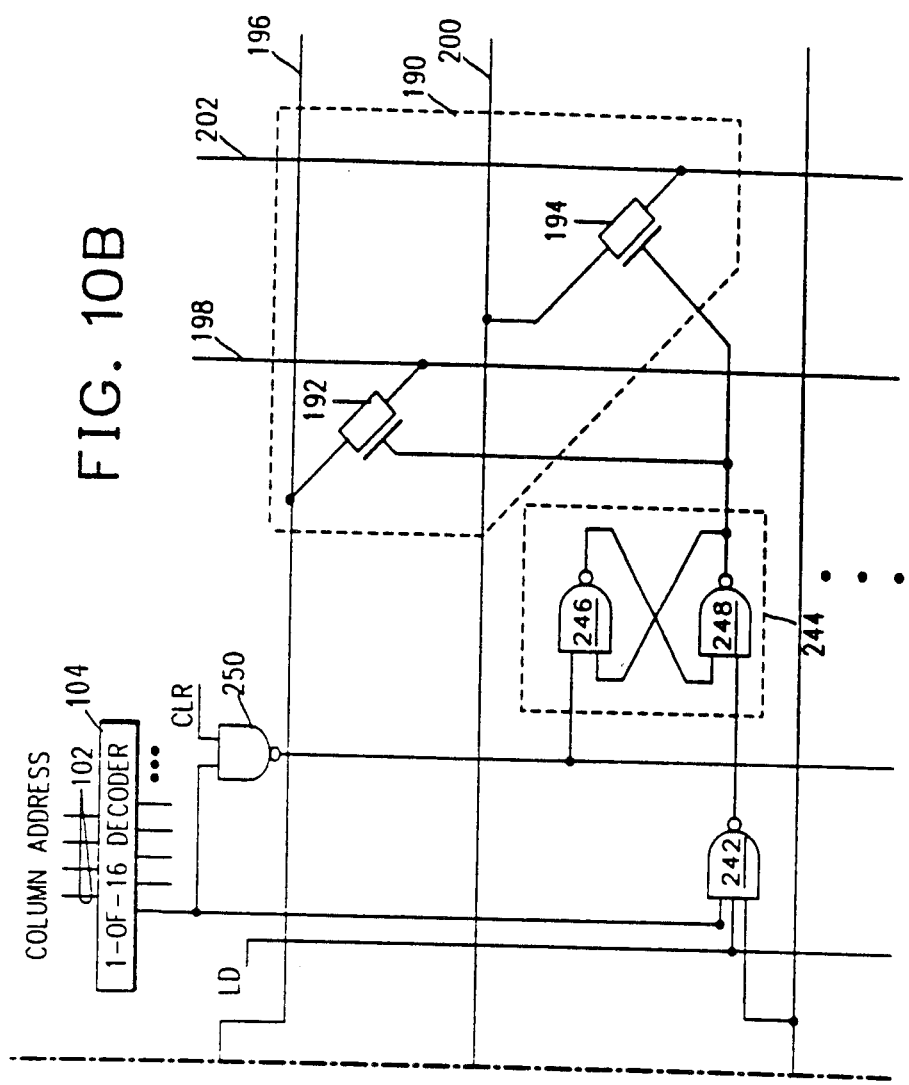

A possible implementation of this type of circuitry necessary to control the switching chip of FIG. 9 is illustrated in FIG. 10 for a 32×16 full-duplex switching chip. With the larger number of rows, the row address bus 100 needs five bit lines which are connected to the inputs of a 1-of-32 row decoder 210. One of the 32 outputs of the row decoder 210 is led to a row enable section 212 for the entire row containing the cross-point 190 and is connected to the inputs of four three-input NAND gates 214, 216, 218 and 220. Two of the NAND gates 214 and 216 are enabled by the destination row select signal DRS and their outputs are connected to the inputs of a destination row enable flip-flop 222. The NAND gate 214 with the load signal LD connected to an input has its output connected to a complemented set input of the flip-flop 222 while the NAND gate 216 with the clear signal CLR connected to an input has its output connected to a complemented reset input of the flip-flop 222. Similarily, the NAND gates 218 and 220 are enabled by the source row select signal SRS and are connected to the inputs of a source row enable flip-flop 224.

The complemented outputs of the source and destination row enable flip-flops 224 and 222 are combined in a NAND gate 226 to enable a receiver 228 on the receive line 206 and a driver 230 on the send line 208. The NAND gate 226 is operating as an OR gate with inverting inputs. The receiver 228 and driver 230 are thus enabled whenever any cross-point on that row is activated as either a source or a destination cross-point. The double 1-of-2 multiplexer consists of four two-input NAND gates 232, 234, 236 and 238. Of these, two NAND gates 232 and 238 are enabled by the true output of the source row enable flip-flop 224 when one cross-point in that row is activated as a source cross-point. On the other hand, the other two NAND gates 234 and 236 are enabled by the true output of the destination row enable flip-flip 222 for a destination cross-point in that row.

The outputs of the NAND gates 214 and 220, which are also the set inputs of the destination and source two enable flip-flops 222 and 224, are combined in a NAND gate 240, also operating as an inverting input OR gate. The output of the OR gate 240 goes true whenever a true load signal LD is accompanied by a true row select signal SRS or DRS, for either a source or a destination cross-point in that row.

The output of the OR gate 240 controls all cross-points in that row while one of the outputs of the column decoder controls all cross-points in that column. Associated with each cross-point 196 is a three-input NAND gate 242 receiving the row output of the NAND gate 240, the column output of the column decoder 104 and the load signal LD. The output of the NAND gate 242 designated by the row and column signals goes low during a true load signal LD and sets a cross-point flip-flop 244 consisting of two cross-coupled NAND gates 246 and 248. The set output of the cross-point flip-flop 244 switches the two bi-directional FETs 192 and 194 into a high conductivity state, whether the cross-point 190 is selected as a source or a destination cross-point.

For disconnecting cross-points, the column signal from the column decoder 104 is combined with the clear signal CLR in a NAND gate 250. The output of the NAND gate 250 resets every cross-point flip-flop 244 in that column to interrupt the conduction paths of the associated FETs 192 and 194.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A duplex cross-point switch comprising:
   M inputs lines;
   M outputs lines, said input and output lines being arranged in pairs of input/output lines;
   N pairs of bi-directional interconnection lines; and
   M×N duplex cross-points, N cross-points being connected to each pair of input/output lines, two selected cross-points directly connecting two pairs of input/output lines to a selected one of said N pairs of interconnection lines;
   wherein each duplex cross-point comprises four AND gates connected between said input/output lines and said interconnection lines for selectively passing data from an input line to either of said pair of interconnection lines and from either of said pair of interconnection lines to an output line.

2. A duplex cross-point switch comprising:
   M input lines;
   M output lines, said input and output lines being arranged in pairs of input/output lines;
   N pairs of bi-directional interconnection lines; and
   M×N duplex cross-points, N cross-points being connected to each pair of input/output lines, two selected cross-points directly connecting two pairs of input/output lines to a selected one of said N pairs of interconnection lines;
   wherein each duplex cross-point comprises four bi-directional switches connected between said input/output lines and said interconnection lines for selectively passing data between either of said input/output lines and either of said interconnection lines.

3. A full-duplex one-sided cross-point switching system, comprising:
   M·J external input lines;
   M·J external output lines, said input lines and output lines being arranged in pairs of external input/output lines;
   N·K pairs of bi-directional external interconnection lines; and
   J×K switching chips, each switching chip comprising:
   M internal output lines and M internal input lines, each selectively connectable to only one of the external input lines and external output lines respectively, said internal input and output lines being arranged in pairs of internal input/output lines;
   N pairs of bi-directional internal interconnection lines, each internal interconnection line being selectively coupled to an external interconnection line; and
   M×N duplex cross-points, N cross-points being connected to each pair of internal input/output lines on said chip for connecting said pair of internal input/output lines to any pair of said internal interconnection lines of said chip, the flow of data on each of said internal and external interconnecting lines dependent upon the relative positions of two cross-points set on said each external connecting lines and the internal interconnecting lines coupled thereto;
   wherein J, K, M and N all have values greater than one.

4. A duplex cross-point switch, comprising:
   a plurality of pairs of lines, one line in each pair being an input line and the other line in each pair being an output line, thereby defining a pair of input/output lines;
   a plurality of pairs of bi-directional interconnection lines;
   first means for connecting a selected pair of said input/output lines to a selected pair of said bi-directional interconnection lines, each of said pair of input/output lines being connected to a respective interconnection line, each said interconnection line being connectable to any of said input/output lines; and
   second means for selectively connecting said pair of interconnection lines to a pair of lines external to said switch, wherein said second connecting means comprisies a pair of drivers coupled to said pair of interconnection lines, said drivers being switchable between on and off and also between directions of driving.

5. A duplex cross-point switch, comprising:
   a plurality of pairs of lines, one line in each pair being an input line and the other line in each pair being an output line, thereby defining a pair of input/output lines;
   a plurality of pairs of bi-directional interconnection lines;
   first means for connecting a selected pair of said input/output lines to a selected pair of said bi-directional interconnection lines, each of said pair of input/output lines being connected to a respective interconnection line, each said interconnection line being connectable to any of said input/output lines; and
   second means for selectively connecting said pair of interconnection lines to a pair of lines external to said switch;
   a first address bus for designating one of said input/output lines;
   a first latch receiving said first address bus; and
   a first decoder receivng the output of said first latch for producing a signal on one of its outputs, said outputs being connected to said first connecting means.

6. A duplex cross-point switch as recited in claim 5, further comprising:
   a second address bus for designating one of said pairs of interconnection lines;
   a second decoder receiving said second address bus, the output of said second decoder enabling said first latch and decoder.

7. A duplex cross-point switch comprising:
   M input lines;
   M output lines, said input and output lines being arranged in pairs of input/output lines;
   M double 1-to-2 multiplexers for switching each pair of input/output lines;
   N pairs of bi-directional interconnection lines; and
   M×N duplex cross-points, N cross-points being connected to each pair of input/output lines for connecting said pairs of input/output lines to any one of said N pairs of interconnection lines;
   wherein each duplex cross-point comprises two bi-directional switches connected between said input/output lines and said interconnection lines.

8. A duplex cross-point switch comprising:
   M input lines;
   M output lines, said input and output lines being arranged in pairs of input/output lines;
   N pairs of bi-directional interconnection lines;

M×N duplex cross-points, N cross-points being connected to each pair of input/output lines for connecting said pair of input/output lines to any one of said N pairs of interconnection lines;
a row address bus for designating a pair of input/output lines; and
N 1-of-M decoders receiving and selectively latching said row address bus for producing an enable signal on one of M output lines, each output line enabling one of M cross-points connected to one pair of interconnection lines.

9. A duplex cross-point as recited in claim 8, further comprising:
a column address bus for designating a pair of interconnection lines;
a 1-of-N decoder receiving said column address bus for producing a select signal on one of its N outputs, each of said N outputs being connected to one of said N decoders for selecting the latching thereof;
M internal output lines, each connectable to one of the external output lines, said internal input and output lines being arranged in pairs of internal input/output lines;
N pairs of bi-directional internal interconnection lines, each internal interconnection line being connectable to one of the external interconnection lines; and
M×N duplex cross-points, N cross-points being connected to each pair of internal input/output lines for selectively connecting said pair of input/output lines to any one of said N pairs of internal interconnection lines.

10. A full-duplex one-sided cross-point switching system comprising:
M·J external input lines;
M·J external output lines, said input lines and output lines being arranged in pairs of external input/output lines;
N·K pairs of bi-directional external interconnection lines; and
J×K switching chips, each switching chip comprising:
M internal output lines and M internal input lines, each internal input line connectable to one of the external input lines, said internal input and output lines being arranged in pairs of internal input/output lines;
N pairs of bi-directional internal interconnection lines, each internal interconnection line being selectively coupled to an external interconnection line;
N pairs of drivers and receivers coupling said internal interconnection lines to said external interconnection lines, said drivers being switchable between on and off and between directions of driving; said
M×N duplex cross-points, N cross-points being connected to each pair of internal input/output lines on said chip for connecting said pair of internal input/output lines to any pair of said internal interconnection lines on said chip.

11. A full-duplex one-sided cross-point switching system, comprising:
M·J external input lines;
M·J external output lines, said input lines and output lines being arranged in pairs of external input/output lines;
N·K pairs of bi-directional external interconnection lines; and
J×K switching chips, each switching chip comprising:
M internal output lines and M internal input lines, each internal input line connectable to one of the external input lines, said internal input and output lines being arranged in pairs of internal input/output lines;
N pairs of bi-directional internal interconnection lines, each internal interconnection line being selectively coupled to an external interconnection line;
M×N duplex cross-points, N cross-points being connected to each pair of internal input/output lines on said chip for connecting said pair of internal input/output lines to any pair of said internal interconnection lines on said chip;
N selectable receivers coupling each said external input line to an internal input line; and
N selectable drivers coupling each said internal output line to an external output line.

12. A switching system, as recited in claim 11, wherein each driver and receiver coupled to said internal output line is a latching driver and receiver and further comprising a clock signal line for latching each said driver and receiver, whereby data flow is pipelined through the switching system.

13. A full-duplex one-sided cross-point switching system, comprising:
M·J external input lines;
M·J external output lines, said input lines and output lines being arranged in pairs of external input/output lines;
N·K pairs of bi-directional external interconnection lines; and
J×K switching chips, each switching chip comprising:
M internal output lines and M internal input lines, each internal input line connectable to one of the external input lines, said internal input and output lines being arranged in pairs of internal input/output lines;
N pairs of bi-directional internal interconnection lines, each internal interconnection line being selectively coupled to an external interconnection line; and
M×N duplex cross-points, N cross-points being connected to each pair of internal input/output lines on said chip for connecting said pair of internal input/output lines to any pair of said internal interconnection lines on said chip;
said switching system further comprising:
a row address bus connected to each said switching chip for designating one of said M pairs of internal input/output lines;
a column address bus connected to each said switching chip for designating one of said N pairs of internal interconnection lines;
means for selecting any of said switching chips; and
means for activating a cross-point connected to said designated pair of input/output lines and connectable to said designated internal interconnection line on said selected switching chip.

14. A switching system, as recited in claim 13, further including means for designating an activated cross-point as a first type or a second type; and wherein said activating means activates a first type cross-point for information flow in a first set of directions through said cross-point and activates a second type cross-point for information flow in a second set of directions.

15. A switching system as recited in claim 14, wherein each cross-point comprises four AND gates connected between said internal input/output lines and said internal interconnection lines.

16. A switching system as recited in claim 14, wherein each cross-point comprises four bidirectional switches connected between said internal input/output lines and said internal interconnection lines.

17. A switching system as recited in claim 14, wherein each cross-point comprises two bidirectional switches connected between said internal input/output lines and said internal interconnection lines and wherein each switching chip further comprises M double 1-of-2 multiplexers for switching said internal input/output lines.

18. A switching system, as recited in claim 17, wherein each driver and receiver coupled to said internal output line is a latching driver and receiver and further comprising a clock signal line for latching each said driver and receiver, whereby data flow is pipelined through the switching system.

* * * * *